(12) United States Patent
Scott

(10) Patent No.: US 6,470,046 B1
(45) Date of Patent: Oct. 22, 2002

(54) APPARATUS AND METHOD FOR A COMBINED DSL AND VOICE SYSTEM

(75) Inventor: Robert E. Scott, Largo, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/032,387

(22) Filed: Feb. 26, 1998

Related U.S. Application Data (60) Provisional application No. 60/039,430, filed on Feb. 26, 1997.

(51) Int. Cl.$^7$ .................................................. H04B 1/38
(52) U.S. Cl. .................. 375/222; 379/27.08; 379/93.08
(58) Field of Search ................................. 375/219, 220, 375/222, 377; 370/452, 468; 379/27.08, 28, 93.01, 93.05, 93.08, 93.09

(56) References Cited

U.S. PATENT DOCUMENTS

| | | | | |
|---|---|---|---|---|
| 5,764,639 A | * | 6/1998 | Staples et al. | 370/401 |
| 5,815,505 A | * | 9/1998 | Mills | 370/522 |
| 5,859,872 A | * | 1/1999 | Townshend | 375/242 |
| 5,889,856 A | * | 3/1999 | O'Toole et al. | 379/399 |
| 5,903,572 A | * | 5/1999 | Wright et al. | 370/524 |
| 5,956,323 A | * | 9/1999 | Bowie | 370/241 |
| 5,991,311 A | * | 11/1999 | Long et al. | 370/524 |
| 6,031,897 A | * | 2/2000 | Bremer et al. | 379/106.08 |
| 6,055,268 A | * | 4/2000 | Timm et al. | 375/229 |
| 6,084,885 A | * | 7/2000 | Scott | 370/455 |
| 6,157,680 A | * | 12/2000 | Betts et al. | 375/285 |
| 6,212,272 B1 | * | 4/2001 | Herschler et al. | 379/399 |
| 6,246,695 B1 | * | 6/2001 | Seazholtz et al. | 370/468 |

FOREIGN PATENT DOCUMENTS

EP          0 716 533 A2    * 11/1995

* cited by examiner

*Primary Examiner*—Young T. Tse
(74) *Attorney, Agent, or Firm*—Thomas, Kayden, Horstemeyer & Risley, LLP (57) ABSTRACT

Apparatus and method for a central office data communications apparatus allows for combining the voice POTS and high speed modem data processing functions into one device at the central office. The combination of the signals allows for a single high-speed CODEC which samples both a POTS signal and the high-speed modem signals to be utilized. This eliminates the need for external POTS splitters and costly duplicative circuitry.

20 Claims, 6 Drawing Sheets

APPARATUS AND METHOD FOR A COMBINED DSL AND VOICE SYSTEM

CROSS-REFERENCE TO RELATED APPLICATIONS

This application claims the benefit of U.S. Provisional Patent Application Serial. No. 60/039,430, filed on Feb. 26, 1997, and entitled "Combined DSL/Channel Bank".

BACKGROUND OF THE INVENTION

1. Field of the Invention

The present invention generally relates to telecommunications and, more particularly, to an apparatus and method for combining POTS and DSL apparatus and function into one device. The combination uses a single highspeed CODEC which samples both the POTS signal and the DSL signal.

2. Description of the Invention

As known in the art, high-speed modems are able to transfer data at high rates over a local loop. In order to accomplish these high data rates, the high-speed digital modems use frequencies which are significantly higher than the voice band frequencies used in the plain old telephone system ("POTS").

However, such modems require that the central office wire center utilize a POTS splitter device to separate the POTS voice band frequencies, occurring in the frequency spectrum between about 0 Hz and about 4 kHz, from the highspeed digital modem data using the frequency spectrum of between about 20 kHz and about 1 MHz. This setup also requires that there be duplicative hardware to process the POTS voice and digital modem frequencies. The hardware converts the voice data into digital data for transmission over a voice time division multiplexing (TDM) bus, and the digital signal that is processed by analog front end and coder/decoder (CODEC) devices converts the highspeed modem data from the analog frequencies back to digital data. Unfortunately, the manufacture and installation of POTS filters and duplicative coder/decoder and analog front end logic are expensive and their use sometimes requires the rewiring of the central office wire center.

Consequently, it would be desirable to avoid the use of the POTS splitter and duplicative analog front-end and coder/decoder logic, which saves space due to the reduced circuitry and avoids the expense the extra circuitry imposes.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a central office data communications apparatus and method, that allows a combined voice POTS and high speed modem processing functions into one device at the central office. The combination of the signals allows for a single high-speed CODEC which samples both a POTS signal and the high-speed modem signals to be utilized. This eliminates the need for external POTS splitters and costly duplicative circuitry.

One embodiment of the modem apparatus and method for a combined digital subscriber line (DSL) and voice system includes apparatus for processing the voice POTS signals and the speed modem signals through a common analog front end high-speed coder/decoder (CODEC) circuitry. The digital signals from the high-speed CODEC are provided to a DSP logic which provides for support of multiple voice lines. Once connected, voice POTS frequencies are not bursty, and therefore, need to be serviced on an eight kHz sample rate in both directions. The digital signal processor (DSP) provides this processing by filtering between voice and high speed modem data in the DSP itself.

The preferred embodiment includes a sample rate of 192 kHz. However, any sample rate is possible as long as it is a multiple of the eight kHz, because the voice POTS signal is always sampled at an eight kHz rate in order to interface to the public switched telephone network (PSTN) network. Since the conversion and filtering between voice and high speed modem data is not run time extensive, the DSP can service multiple subscriber lines simultaneously without saturation.

The invention can also be viewed as providing a method for allowing combined voice POTS and high speed modem processing functions in one device. In this regard, the method can be broadly summarized by the following steps:

interfacing to a local loop capable of simultaneously carrying both a POTS signal and high speed modem signals;

sampling both said POTS and said high speed modem signals with a single codec; and processing both said sampled POTS and said sampled modem signals.

BRIEF DESCRIPTION OF THE DRAWINGS

The accompanying drawings incorporated in and forming a part of the specification illustrate several aspects of the present invention, and together with the description, serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Figure 1:
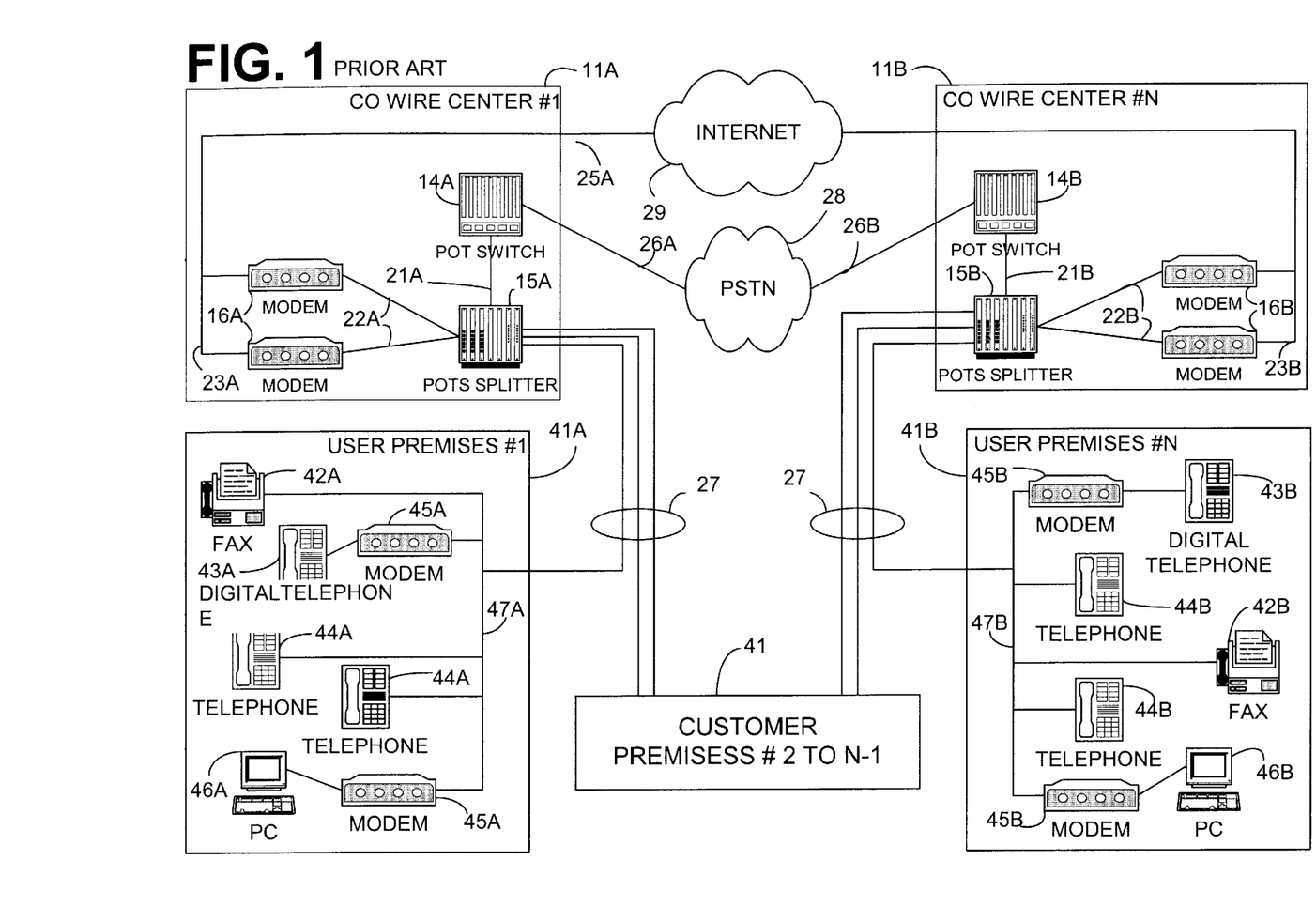
FIG. 1 is a schematic view of the central office (CO) wire centers and user premises layout.

Referring now in detail to the drawings in which the reference numerals indicate like parts throughout several views, FIG. 1 illustrates the plain old telephone system (POTS) networks including data communication modems (16 and 45) of the prior art. The POTS network includes numerous user premises 41, wherein each user premises is connected to a central office wire center 11, via a subscriber line 27. Each subscriber line 27 is connected to the user premises 41, which further connects to a user premises line 47, for distribution of POTS service throughout the user premises. Usually, there are numerous POTS devices connected to each user premises line 47, such as telephones 44, fax machines 42, PCs 43, and the like. It is also known, but not shown, that it is possible to have multiple subscriber lines 27 connected to each user premises, thereby creating two separate user premises lines 47 within each user premises.

As noted previously, each user premises is connected via a subscriber line 27 to a central office wire center 11. The subscriber line 27 is connected to a POTS splitter device 15 that separates the analog POTS signals from data signals. The POTS signals are sent to a POTS switch 14 that is connected to the other central office wire centers, via the public switched telephone network (PSTN) 28. Modem data signals are separated from the POTS analog signals at POTS splitter 15, and are connected to modems 16 within the central office wire center 11. Modems 16 are further connected to digital data networks such as the Internet 29.

A brief discussion of an example for the signals generated in the applied system environment for the prior art from the user premises and transmitted through the central office wire center, via either the PSTN or Internet networks and back to a user premises will now be detailed.

When a user wishes to place a telephone call on device 44, the user picks up the receiver and puts the subscriber line 27 in an off-hook condition that is detected at the central office wire center 11, by closed switch hooks (not shown). The off-hook condition signals the central office wire center 11, via subscriber line 27, to accept an outgoing call by allowing a flow of D.C. current and a dial tone of 480 Hz to be sent to device 44. The outgoing telephone call signals are transmitted, as described before, via subscriber line 27 to POTS splitter 15. The analog POTS system signals are separated from the modem signals, and the POTS signals are directed towards the POTS switch 14 for transmission, via the PSTN network 28, to the destination central office wire center 11 of the destination user premises 41. The signal is further directed towards a POTS splitter 15 within the destination central office wire center 11. The signal is transmitted, via subscriber line 27, to the destination user premises 41. The modem signal enters the destination user premises 41, via subscriber line 27, and is connected to the user premises line 47 that distributes the signal to be received throughout the destination user premises 41. This is the path in which a plain old telephone system (POTS) call is transmitted.

Now, a description of digital signals to/from the user premises will be described. When a user desires to transmit data over a digital network via his personal PC 46, digital phone 44, or the like, the digital signals from the digital device, are transformed into analog signals, via modulation by modem 45. The signals are transmitted over the user premises line 47 to the subscriber line 27 for final delivery to the local central office wire center 11. The digitally modulated analog signals going into POTS splitter 15, are separated from the analog POTS signals, and are directed to modems 16. Modems 16 demodulate the analog signals back to their original digital data signals. The modems 16 transmit the digital data over the Internet 29. The digital data signals sent via the Internet 29 are received at the destination central office wire center 11 by the modems 16. The modems 16 modulate the digital signals into analog signals for transmission through the POTS splitter 15 and over destination subscriber line 27 to the destination user premises 41. The modulated signals are received at the user premises line 47, for distribution to all equipment connected to the user premises distribution line. The modulated signals are demodulated, within the destination modem 45, back to a digital signals, which are transmitted to the digital device connected to the modem.

Figure 2:
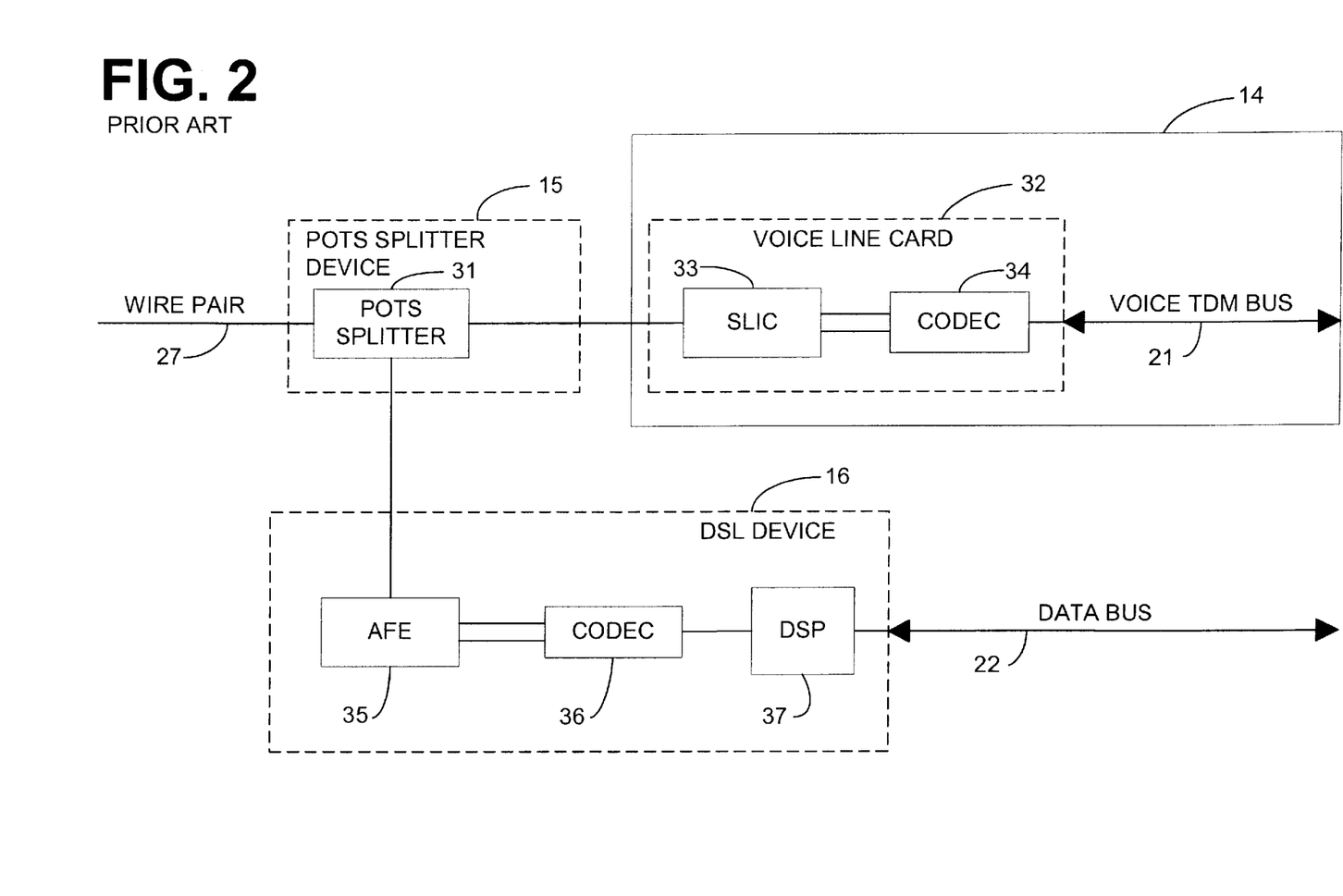
FIG. 2 is a block diagram of the CO POTS interface, the POTS switch analog conversion card and the DSL modem apparatuses of FIG. 1.

FIG. 2 illustrates the separate central office POTS interface, the POTS Switch analog conversion card, and the DSL modem apparatuses of the prior art.

The POTS splitter device 15 illustrated in FIG. 2 is connected to the subscriber line wire pair 27 which transmits both voice POTS and high-speed modem data into the central wire office 11. The POTS splitter device separates the low voice POTS frequency spectrum of 0 kHz to 4 kHz and transmits them as described above to POTS switch 14. The POTS switch 14 contains within it a voice line card 32, comprising the subscriber line interface circuit 33 and CODEC 34.

The CODEC 34 converts the analog voice signals into digital signals and transmits them, via the voice TDM bus 21, across the PSTN network 28 to the destination central office wire center for transmission to the destination user premise 41, as described above. The high-speed digital modem signals on the subscriber line wire pair 27 are separated from the voice signals and provided to a modem device 16 for processing.

The modem device 16 comprises an analog front end 35, which transforms the two wire high speed analog data signals, utilizing the frequency spectrum of between about 20 kHz and 1 MHz into four wire loops, and transmits the analog signals over the four wire loops to the CODEC device 36 for conversion from analog signals into digital data. The high-speed digital data is then output from the CODEC 36 into the DSP digital signal processor (DSP) 37 logic for processing and further transmission via the digital data bus (22). As can be seen by FIG. 2, there is duplicate hardware in both the POTS switch 14 and the modem 16 devices which include the analog front end 35 and subscriber link interface circuit 33, and the CODEC 34 and 36 devices.

Figure 3:
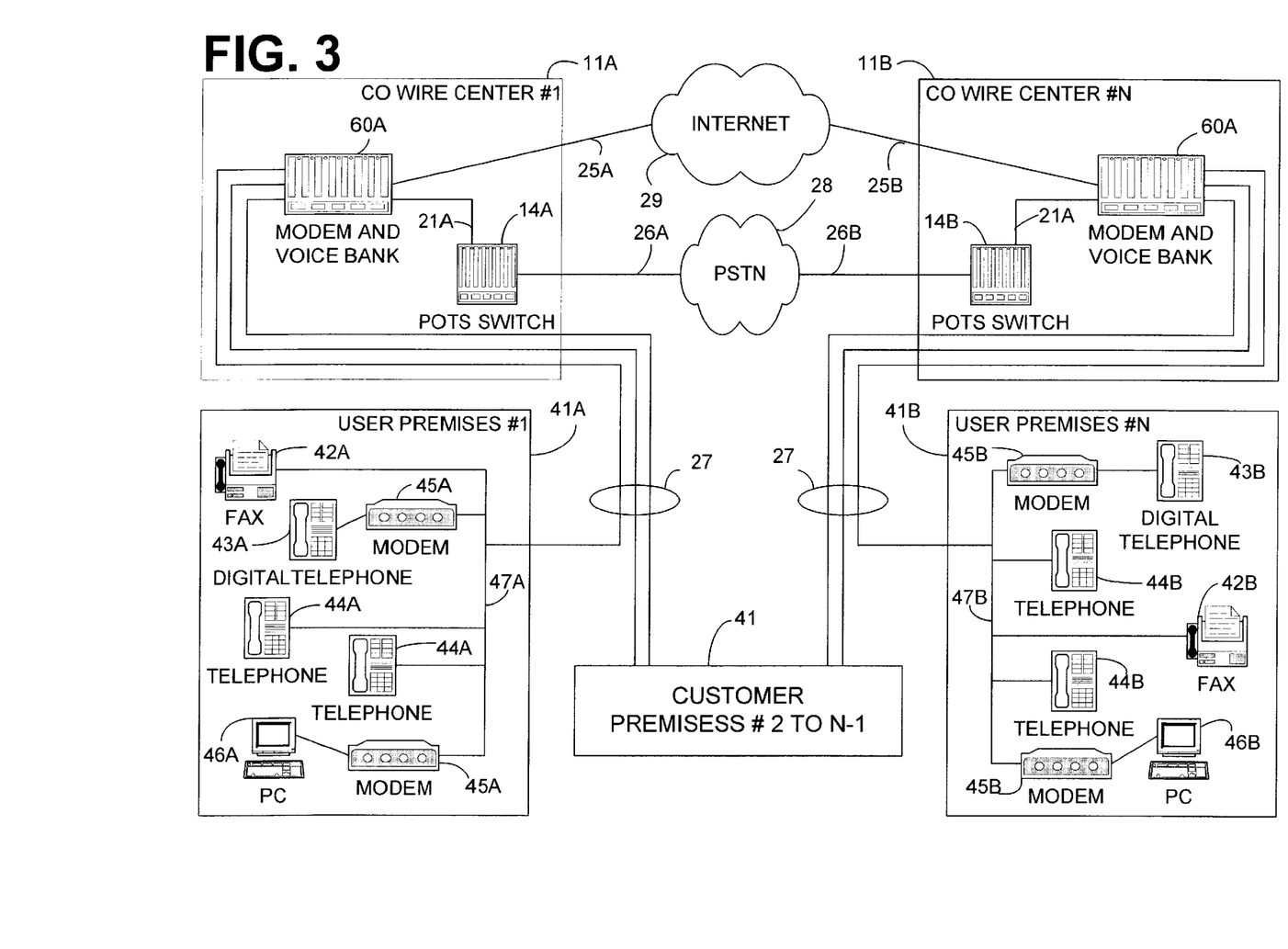
FIG. 3 is a schematic view of the CO wire centers and user premises layout with the modem bank, that combines the central office DSL modem and the POTS switch analog conversion card for voice data signals, apparatus of the present invention.

FIG. 3 illustrates the plain old telephone system (POTS) networks including data communication modem and voice bank 60 of the present invention. It is shown that the present invention communication modem bank 60 can be substituted for the POTS splitter 15 and high-speed data modem 16. The network is otherwise the same.

Figure 4:
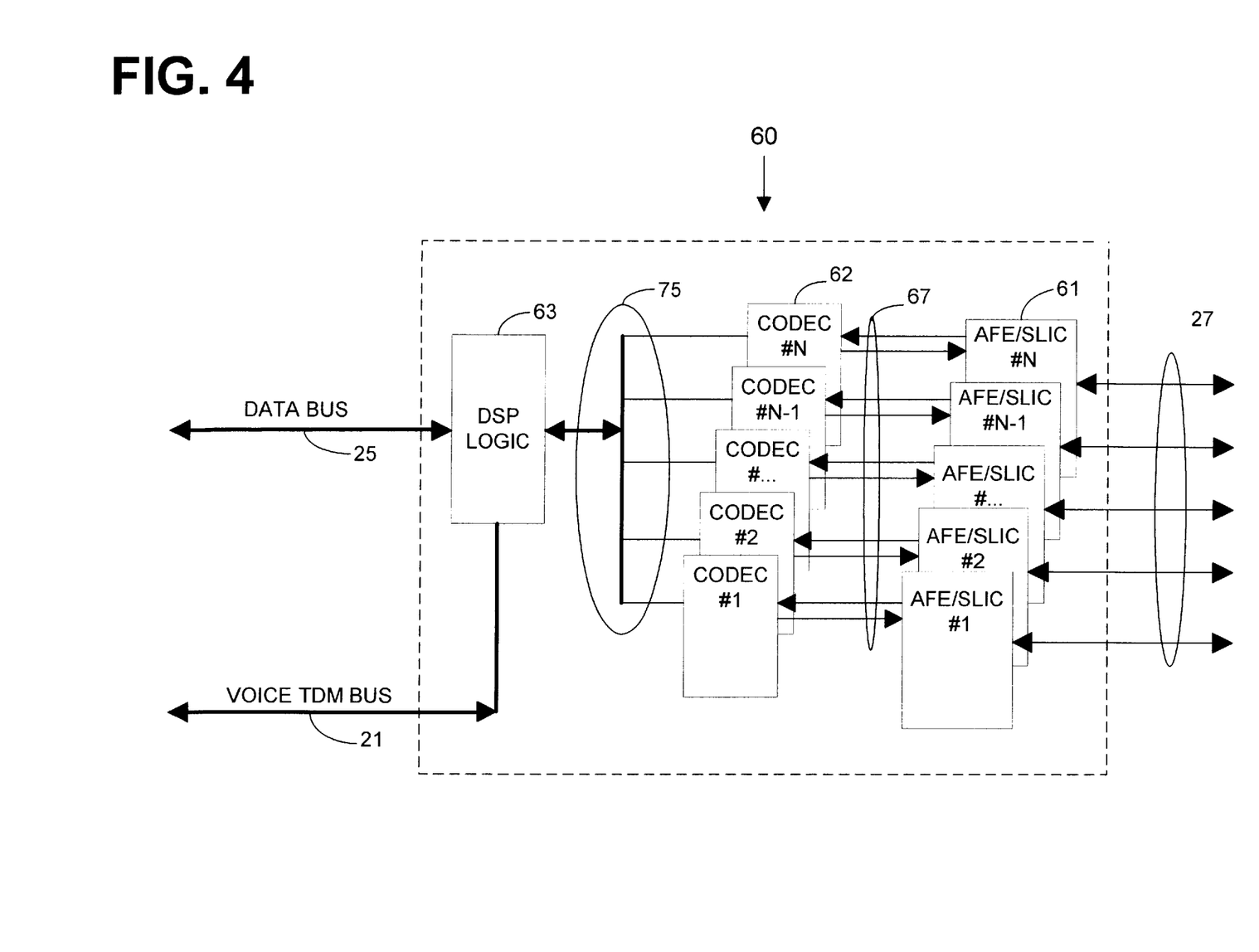
FIG. 4 is a block diagram of the modem bank of FIG. 3.
Figure 5:
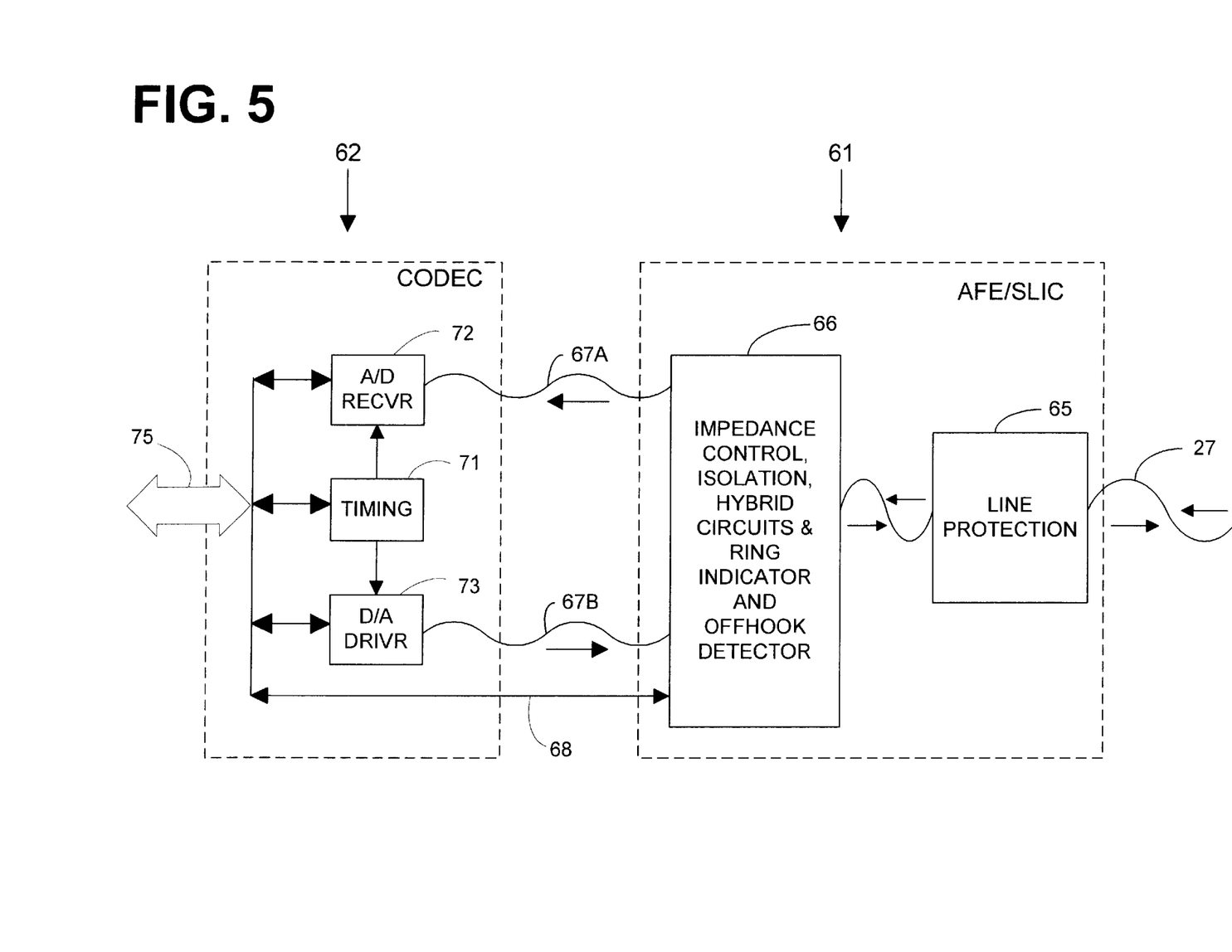
FIG. 5 is a block diagram of the analog front end and subscriber line interface circuit, and the coder/decoder circuit of FIG. 4.

Referring now to FIG. 4, illustrated is a block diagram of the modem bank 60 that combines the voice POTS and high-speed modem data functionality into one device. The modem and voice bank 60 utilizes a single analog front end/subscriber link interface (AFE/SLIC) circuit 61 to interface to the subscriber link 27 which is connecte d to the user premise 41. The AFE/SLIC 61 herein defined in further detail with regard to FIG. 5 provides for the hybrid circuits, ring indicator, off/hook detector, and line protection circuitry. The AFE/SLIC 61, by utilizing the hybrid circuit, provides for a one way analog communication link for a signal in each direction on lines 67A and 67B. This a nalog signal is transmitted between the AFE/SLIC 61 and the CODEC 62. The CODEC 62 herein defined in further detail with regard to FIG. 5 provides the actual coding of digital to analog signals and decoding of analog to digital signals. The digital signals from CODEC 62 are transmitted between the CODEC 62 are the DSP logic 63 across bus 75. Bus 75 provides a multiplexing of digital signals from one of a plurality of operating CODECs 62 to the DSP logic 63 at any particular time. The DSP logic 63, herein defined in further detail with regard to FIG. 6, processes the digital data received from line 75 and filters out the voice POTS signals from the digital data signals.

The DSP logic 63 then transmits the voice POTS signals to the POTS switch 14 (FIG. 3) for transmission across the PSTN network 28 to the destination central office wire center 11 POTS switch 14. The digital data is filtered and transmitted on data bus 25, and over the Internet 29 to the destination CO wire center 11. DSP logic 63 is herein defined in further detail with regard to FIG. 6.

Since it is assumed that DSP sharing is provided, multiple AFE/SLICs 61 and CODECs 62 can share the processing power of the DSP logic 63 which can support numerous simultaneous transmissions through the central office wire center. The DSP sharing includes voice sharing which assumes that the voice has a low peak busy hour rate, probably lower than data due to shorter hold times. Once connected, the voice signal is not bursty, therefore, it needs to be serviced on an eight kHz sample rate in both directions. This can be done because the voice processing, which converts 12 bit linear code into eight bit mu-law code, is done in this DSP logic 63 and is not run time extensive. Filtering between the voice signals and data signals is also done in DSP logic 63, eliminating the need for a separate POTS filter.

Referring now to FIG. 5, illustrated is shown the AFE/SLIC 61 and the CODEC 62 functional block diagram. The subscriber line 27 is a bidirectional wire pair from the subscriber user premise 41 and is connected to a line protection circuitry 65. Line protection circuit 65 protects the multi-channel communications device against line surges, lightening strikes and the like. Line protection circuit 65 is then further connected to the impedance and isolation circuit 66 via a communication link. The impedance and isolation circuit 66 contains circuitry for impedance control, isolation, hybrid circuits, ring indicator and off-hook detector (not shown). The AFE/SLIC 61 is then connected via communication link 67 to the CODEC 62.

With further reference to FIG. 5, CODEC 62 receives analog signals via line 67A for conversion from analog to digital receiver circuit 72. Analog to digital receiver 72 is provided timing by timing circuit 71. Timing circuit 71 provides timing signals to process the analog to digital and digital to analog transformations. The output of the analog to digital receiver 72 is digitized data which is placed on bi-directional bus 75.

Digital communication link 75 and 25 can be comprised of 8, 16, 32, 64, 128 or other bit sized digital parallel communication link. Communication link 25 and 75 can also be comprised of a bit serial or other type of chip to chip signal communication links. Communication link 67B transmits analog signals coded by the digital to analog driver 73. The digital to analog driver 73 receives digital signals for transmission across digital communication link 75.

Interface 68 carries the control and status information from the digital signal processor to the impedance control isolation circuitry 66 of AFE/SLIC circuitry 61.

Figure 6:
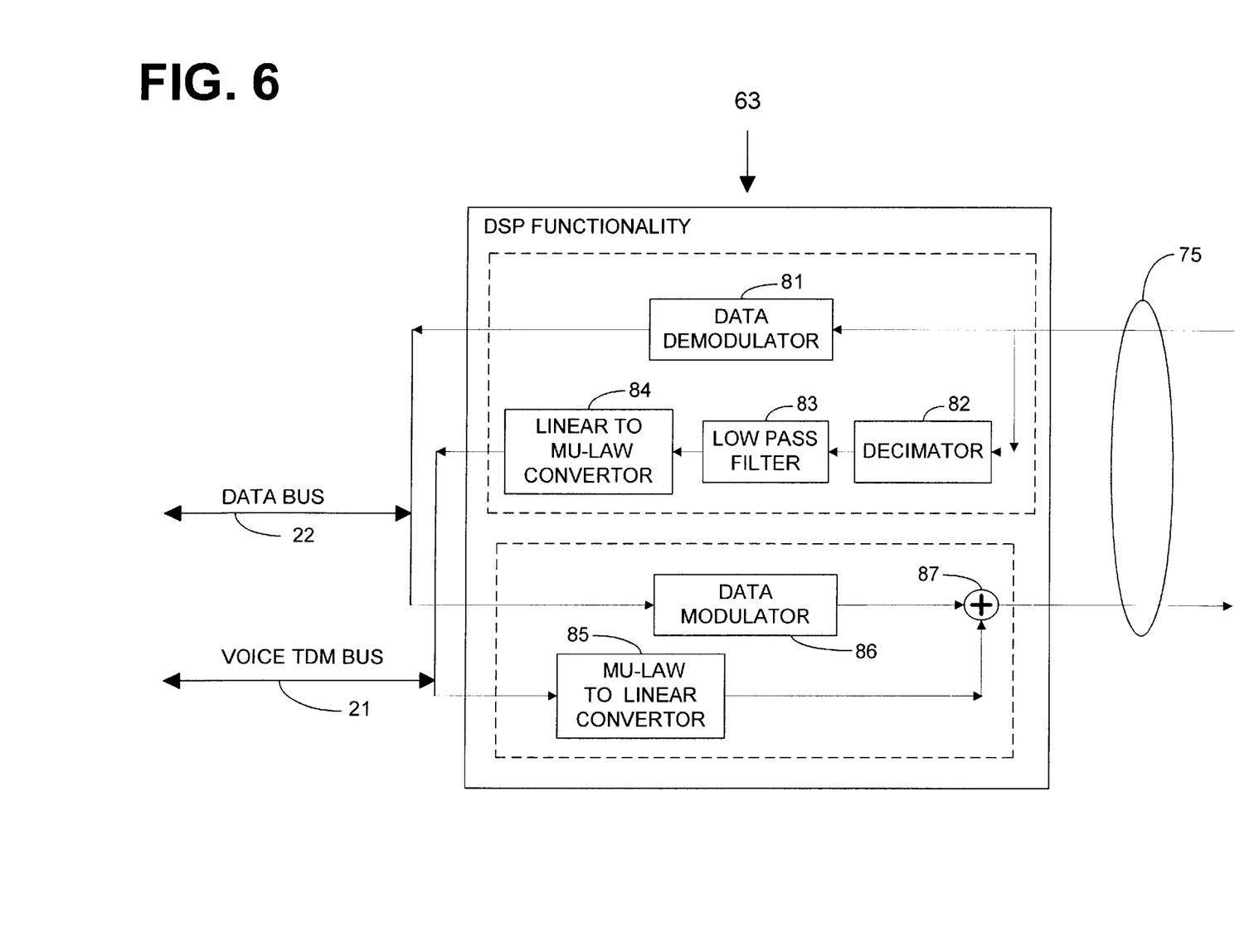
FIG. 6 is a block diagram of the digital signal processor engine of FIG. 4.

Referring now to FIG. 6, illustrated is the DSP 63 block diagram of the functionality of the DSP logic 63. Digital signals are received on communication link 75 and are provided to the data demodulator 81 and to the decimator 82. For the voice POTS signals, the decimator 82 reduces the voice sample rate to eight kHz. The signal is then sent through a low pass filter 83 which eliminates the high frequency data signals. A linear to mu-law converter 84 converts the voice signals for output onto a voice time division multiplexing (TDM) bus 21. The voice POTS signal is combined with voice signals from other channels to make up the TDM bus. The digital demodulator 81 receives the high speed digital signals from the CODEC 62, demodulates these signals, and transmits them across data bus 22 for further transmission over the Internet 29.

The transmit path through the DSP logic 63 has the data modulator 86 receiving high speed digital data signals from the data bus 22. The voice TDM bus 21 provides a digitized voice signal to the mu-law to linear converter 85. The mu-law to linear converter 85 provides for encoding of the digitized voice POTS signal. In an alternative embodiment, A-law encoding may be utilized instead of mu-law encoding. The encoded voice POTS signal is then added to the data signal output from the data modulator 86 in circuitry 87. The voice POTS signal is summed on an eight kHz sample rate while the combined voice and data signal is outputted to the digital to analog converter on a multiple of eight kHz sample rate.

The preferred embodiment provides for the sample rate to be 192K. The above description provides for operation of a single voice and data channel. Other embodiments include multiple AFE/SLIC 61 and multiple CODEC 62s (as shown in FIG. 4) and provides the ability to be active at the same time through DSP sharing using statistical properties of data as described in the U.S. Pat. No. 6,084,885 entitled "APPARATUS AND METHOD FOR DSP SHARING USING STATISTICAL PROPERTIES OF DATA", Ser. No. 09/027, 705 herein incorporated by reference.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. Data communications apparatus comprising:
    an interface circuit to a local loop, said local loop capable of simultaneously carrying both a POTS signal and high speed modem signals;
    a codec capable of simultaneously sampling both said POTS signal and said high speed modem signals; and
    a single signal capable of simultaneously processing both said sampled POTS signal and said sampled modem signals.

2. The apparatus of claim 1, wherein said codec operates at a sample rate that is a multiple of 8 kHz, allowing said codec to support both the 8 kHz POTS signl and the high speed modem signals using said codec, wherein the high speed modem signals use a full multiple of the 8 kHz sample rate.

3. The apparatus of claim 1, wherein said codec comprises:

a linear conversion codec in order to support the high speed modem signals.

4. The apparatus of claim 1, wherein said processor performs a conversion between a linear coding and a non-linear coding as required for pulse code modulation of said POTS signal.

5. The apparatus of claim 4, wherein said non-linear coding comprises:

a mu-law coding.

6. The apparatus of claim 4, wherein said non-linear coding comprises:

an A-law coding.

7. The apparatus of claim 1, wherein said processor circuitry separates the POTS signal from the high speed modem signals said processor circuitry separation eliminates the need for a separate POTS splitter function.

8. A method for use in data communications equipment, the method comprising the steps of:

interfacing to a local loop capable of simultaneously carrying both a POTS signal and high speed modem signals;

sampling both said POTS signal and said high speed modem signals simultaneously with a single codec; and processing both said sampled POTS signal and said modem signals simultaneously by a single signal processing.

9. The method of claim 8, wherein the step of sampling both said POTS signal and said high speed modem signals includes the step of:

operating said codec at a sample rate that is a multiple of 8 kHz that allows said single codec to support both the 8 kHz POTS signal and the high speed modem signals, wherein the high speed modem signals use a full multiple of the 8 kHz sample rate.

10. The method of claim 8, wherein the step of sampling both said POTS signal and said high speed modem signals includes the step of:

using a-linear conversion codec to support the high speed modem signals.

11. The method of claim 8, wherein the step of processing both said sampled POTS signal and said sampled modem signals includes the step of:

performing a conversion between a linear coding and a non-linear coding as required for pulse code modulation of said POTS signal.

12. The method of claim 11, wherein the step of performing the conversion between the linear coding and the non-linear coding includes the step of:

converting between the linear coding and a mu-law coding.

13. The method of claim 11, wherein the step of performing the conversion between the linear coding and the non-linear coding includes the step of:

converting between the linear coding and an A-law coding.

14. The method of claim 8, wherein the step of processing both said sampled POTS sigal and said sampled modem signals includes the steps of:

separating the POTS signal from the sampled modem signals; and eliminating the need for a separate POTS splitter function.

15. Data communications apparatus comprising:

a means for interfacing to a local loop capable of simultaneously carrying both a POTS signal and high speed modem signals;

a means capable of simultaneously sampling both said POTS signal and said high speed modem signals; and a single signal processing means for simultaneously processing both said sampled POTS signal and said sampled modem signals.

16. The apparatus of claim 15, wherein said sampling means operates at a sample rate that is a multiple of 8 kHz to allow said sampling means to support both the 8 kHz POTS signal and the high speed modem signals, wherein the high speed modem signals use a full multiple of the 8 kHz sample rate.

17. The apparatus of claim 15, wherein said sampling means comprises a linear conversion codec to support the high speed modem signals.

18. The apparatus of claim 15, wherein said processing means performs a conversion between a linear coding and a mu-law coding as required for pulse code modulation of said POTS signal.

19. The apparatus of claim 15, wherein said processing means performs a conversion between a linear coding and an A-law coding as required for pulse code modulation of said POTS signal.

20. The apparatus of claim 15, wherein said processing means separates the POTS signal from the sampled modem signals, and eliminates the need for a separate POTS splitter function.

* * * * *

UNITED STATES PATENT AND TRADEMARK OFFICE
CERTIFICATE OF CORRECTION

PATENT NO.     : 6,470,046 B1
DATED          : October 22, 2002
INVENTOR(S)    : Scott It is certified that error appears in the above-identified patent and that said Letters Patent is hereby corrected as shown below:

<u>Column 6,</u>
Line 57, after the word "signal," please insert -- processor --
Line 62, replace "signl" with -- signal --

<u>Column 7,</u>
Line 15, after "modem signals," insert -- , --
Lines 27-28, replace "processing" with -- processor --

Signed and Sealed this

Eighteenth Day of March, 2003

JAMES E. ROGAN
*Director of the United States Patent and Trademark Office*